US012516668B2

(12) United States Patent
Yates

(10) Patent No.: US 12,516,668 B2
(45) Date of Patent: Jan. 6, 2026

(54) GEAR PUMP ASSEMBLY

(71) Applicant: Rolls-Royce plc, London (GB)

(72) Inventor: Martin K. Yates, Derby (GB)

(73) Assignee: Rolls-Royce PLC, London (GB)

(*) Notice: Subject to any disclaimer, the term of this patent is extended or adjusted under 35 U.S.C. 154(b) by 0 days.

(21) Appl. No.: 18/952,298

(22) Filed: Nov. 19, 2024

(65) Prior Publication Data

US 2025/0188925 A1 Jun. 12, 2025

(30) Foreign Application Priority Data

Dec. 12, 2023 (GB) ..................................... 2318900

(51) Int. Cl.
*F04C 2/08* (2006.01)
*F02C 7/22* (2006.01)

(52) U.S. Cl.
CPC ................ *F04C 2/084* (2013.01); *F02C 7/22* (2013.01)

(58) Field of Classification Search
CPC .. F04C 2/084; F04C 11/001; F04C 2210/203; F04C 2240/56; F04C 15/0042; F04C 2/18; F02C 7/22
See application file for complete search history.

(56) References Cited

U.S. PATENT DOCUMENTS 8,342,829 B2 * 1/2013 Achtelik ............... F04C 23/001 418/9
9,945,376 B2 * 4/2018 Ribarov .................. F04C 2/088
11,506,199 B2 * 11/2022 Laperriere .......... F04C 15/0061
2005/0232784 A1 * 10/2005 Yates .................. F04C 15/0073 417/423.1
2014/0144268 A1 * 5/2014 Ward ...................... F04C 2/084 74/397
2016/0208611 A1 * 7/2016 Veilleux, Jr. ........... B23K 26/34
2017/0298934 A1 10/2017 Tsuzuki et al.
2018/0100504 A1 * 4/2018 Yates ...................... F04C 2/107
2019/0078619 A1 3/2019 Masters

FOREIGN PATENT DOCUMENTS

GB 1539515 A 1/1979

OTHER PUBLICATIONS

European search report dated Apr. 30, 2025, issued in EP Patent Application No. 24212864.3.
Great Britain search report dated Jun. 7, 2024, issued in GB Patent Application No. 2318900.4.

* cited by examiner

*Primary Examiner* — Jesse S Bogue

(57) ABSTRACT

A gear pump assembly includes an inlet configured to receive a fluid, an outlet, a main drive shaft, a secondary gear stage, and a primary gear stage configured to pump the fluid from the inlet to the outlet. The secondary gear stage includes a secondary driver gear driven by the main drive shaft, a secondary driver bearing block disposed adjacent to and supporting the secondary driver gear, a secondary driven gear meshed with and driven by the secondary driver gear, a secondary driven bearing block disposed adjacent to and supporting the secondary driven gear, and a driver bore portion receiving the secondary driver bearing block therein. A fluid passage fluidly communicates the primary gear stage with the driver bore portion.

12 Claims, 6 Drawing Sheets

GEAR PUMP ASSEMBLY

CROSS-REFERENCE TO RELATED APPLICATIONS

This specification is based upon and claims the benefit of priority from United Kingdom patent application number GB 2318900.4 filed on Dec. 12, 2023, the entire contents of which is incorporated herein by reference.

BACKGROUND

Technical Field

The present disclosure relates to a gear pump assembly for pumping a fluid, and in particular, to a gear pump assembly for a fuel supply system of a gas turbine engine.

Description of the Related Art

A fuel supply system of a gas turbine engine typically includes a gear pump assembly for pumping the fuel. The gear pump assembly includes a primary gear stage and a secondary gear stage. In the gear pump assembly, gears are commonly supported by bearing blocks which are adapted to receive respective bearing shafts of the gears through a bore of each bearing block. These bearing blocks also typically abut axially directed faces of respective gears of the gear pump assembly. The bearing blocks may be solid bearing blocks or pressure loaded bearing blocks. A solid bearing block typically transfers load from journals to a pump housing, and additionally can transfer axial load to the pump housing. Pressure loaded bearing blocks also transfer load from journals to the pump housing, and in addition can provide an axial force and a moment against the axially directed face of the gear which the bearing block abuts.

In some applications, operation of the gear pump assembly may cause excessive wear on an outer surface of the pressure loaded bearing block of the secondary gear stage. One of the main reasons for this excessive wear of the pressure loaded bearing block is axial and radial movements of the pressure loaded bearing blocks either when the secondary gear stage is in a depressurized state or during the transition of the secondary gear stage between a pressurized state and the depressurized state.

Such axial and radial movements of the pressure loaded bearing block, particularly on the pressure loaded bearing block adjacent to driver gear, is due to low pressure rise across the secondary gear stage and inter-tooth loading between the driver gear and a driven gear in the secondary gear stage of the gear pump assembly. This may reduce an efficiency of the fuel supply system as well as the gas turbine engine. In other words, wear of the pressure loaded bearing block may lead to excessive reduction in delivery flow of the gear pump assembly. Conventional solutions for increasing or maintaining the delivery flow of the gear pump assembly in the depressurized state may induce additional heat to the gear pump assembly, which may require further modifications to a heat management system and a control system with the risk of introducing instabilities in the delivery flow of the gear pump assembly.

Therefore, there is a need for an improved gear pump assembly with reduced axial and radial movements of the pressure loaded bearing block thereby reducing the wear of the pressure loaded bearing block.

SUMMARY

According to a first aspect, a gear pump assembly for pumping a fluid is disclosed. The gear pump assembly includes an inlet configured to receive the fluid. The gear pump assembly further includes an outlet, a main drive shaft, and a secondary gear stage. The secondary gear stage includes a secondary driver gear driven by the main drive shaft, a secondary driver bearing block disposed adjacent to and supporting the secondary driver gear, a secondary driven gear meshed with and driven by the secondary driver gear, and a secondary driven bearing block disposed adjacent to and supporting the secondary driven gear. The gear pump assembly further includes a primary gear stage configured to pump the fluid from the inlet to the outlet. The primary gear stage includes a primary driver gear drivably coupled to and driven by the secondary driven gear. The primary gear stage further includes a primary driven gear meshed with and driven by the primary driver gear. The gear pump assembly further includes a housing receiving the primary gear stage and the secondary gear stage therein. The housing includes a binocular bore. The binocular bore includes a driver bore portion receiving the secondary driver bearing block therein. The binocular bore further includes a driven bore portion disposed adjacent to the driver bore portion and receiving the secondary driven bearing block therein. The gear pump assembly further includes a fluid passage extending through the housing and fluidly communicating the primary gear stage with the driver bore portion. The fluid passage allows a pressurized flow of the fluid from the primary gear stage to the driver bore portion in order to limit a movement of the secondary driver bearing block within the driver bore portion. In some embodiments, each of the secondary driver bearing block and the secondary driven bearing block is a pressure loaded bearing block.

The pressurized flow of the fluid from the primary gear stage to the driver bore portion in the secondary gear stage generates an additional radial load on the secondary driver bearing block thereby limiting the radial and axial movements of the secondary driver bearing block. The reduced movement of the secondary driver bearing block may cause minimal wear of the secondary driver bearing block, particularly when the secondary gear stage is in the depressurized state. The minimal wear of the secondary driver bearing block may prevent radial deformation of the secondary driver bearing block during the operation of the gear pump assembly.

Therefore, the inclusion of the fluid passage between the primary gear stage and the driver bore portion may increase an efficiency and improve performance of the gear pump assembly of the present disclosure.

In some embodiments, the gear pump assembly further includes a flow restrictor fluidly disposed in the fluid passage between the primary gear stage and the driver bore portion to limit a leakage of the fluid from the primary gear stage to the driver bore portion. This may ensure that an adequate pressure is maintained to provide sufficient radial load on the secondary driver bearing block so as to limit the radial and axial movements of the secondary driver bearing block. Prevention of fluid leakage from the primary gear stage to the secondary gear stage may ensure that the secondary gear stage is not pressurized at lower flow pressures of the fluid in the gear pump assembly.

In some embodiments, the flow restrictor is an orifice plate comprising at least one orifice. The orifice plate controls an amount of fluid which can be conveyed from the primary gear stage to the driver bore portion in the secondary gear stage. The at least one orifice may have a circular configuration. In an application, the at least one orifice may include a plurality of orifices. The plurality of orifices may have the same diameter or have different diameters.

In some embodiments, the flow restrictor is a pressure-actuated valve. The pressure-actuated valve may be set to actuate at a particular threshold pressure or may be externally adjustable so as to control the pressurized flow of the fluid from the primary gear stage to the driver bore portion in the secondary gear stage.

In some embodiments, the flow restrictor is an electrically actuated valve. The electrically actuated valve may control the amount of fluid which can be conveyed from the primary gear stage to the driver bore portion in the secondary gear stage in response to receiving a control signal from a controller. The electrically actuated valve may be a solenoid-controlled valve.

In some embodiments, the gear pump assembly further includes a pocket disposed on a surface of the driver bore portion. The pocket is disposed in fluid communication with the fluid passage. The pocket is configured to receive the pressurized flow of the fluid from the fluid passage and deliver the pressurized fluid to the driver bore portion in the secondary gear stage. The pocket acts as a provision for the pressurized fluid to add radial load on the secondary driver bearing block thereby limiting the radial and axial movements of the secondary driver bearing block. The pocket may be formed by machining a surface of the driver bore portion.

In some embodiments, the gear pump assembly further includes a piston bore extending from the driver bore portion and disposed in fluid communication with the fluid passage. The gear pump assembly further includes a piston slidably received within the piston bore and engaging the secondary driver bearing block. The piston is configured to be driven by the pressurized fluid towards the secondary driver bearing block in order to apply a movement limiting force on the secondary driver bearing block. The piston is energized by the flow of the pressurized fluid in order to apply additional radial load on the secondary driver bearing block which in turn reduces the wear of the secondary driver bearing block.

In some embodiments, the gear pump assembly further includes a non-return valve fluidly disposed between the secondary gear stage and the outlet. The non-return valve is configured to allow a unidirectional flow from the secondary gear stage to the outlet. The non-return valve prevents a backflow of the fluid from the outlet to the secondary gear stage. The non-return valve maintains an adequate pressure range in the secondary gear stage. In an application, the non-return valve may be a check valve.

In some embodiments, the gear pump assembly further includes a primary passage fluidly communicating the primary gear stage with the outlet. The gear pump assembly further includes a port fluidly communicating the primary passage with the fluid passage. Thus, the fluid passage is a bleed passage between the primary passage and the secondary gear stage. The bleed passage extends between the port and the driver bore portion in the secondary gear stage. The port may be a vent formed in the housing of the gear pump assembly.

In some embodiments, the secondary gear stage has a greater displacement than the primary gear stage. Typically, the primary gear stage is pressurized at all flight conditions, while the secondary gear stage is pressurized for take-off and low speed start conditions. The secondary gear stage functions as a step-a-side gear box for the primary gear stage.

According to a second aspect, a fuel supply system of a gas turbine engine is disclosed. The fuel supply system includes the gear pump assembly of the first aspect for pumping a fuel. Inclusion of the gear pump assembly of the second aspect in the fuel supply system may improve an overall performance of the fuel supply system to supply the fuel to the gas turbine engine.

According to a third aspect, a gas turbine engine including the fuel supply system of the second aspect is disclosed. Inclusion of the fuel supply system of the third aspect in the gas turbine engine may increase an efficiency of the gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or in the order of) any of the following: 110 Nkg-1 s, 105 Nkg-1 s, 100 Nkg-1 s, 95 Nkg-1 s, 90 Nkg-1 s, 85 Nkg-1 s or 80 Nkg-1 s. The specific thrust may be in an inclusive range bounded by any two of the values in the previous sentence (i.e., the values may form upper or lower bounds), for example in the range of from 80 Nkg-1 s to 100 Nkg-1 s, or 85 Nkg-1 s to 95 Nkg-1 s. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying Figures. Further aspects and embodiments will be apparent to those skilled in the art.

Figure 1:
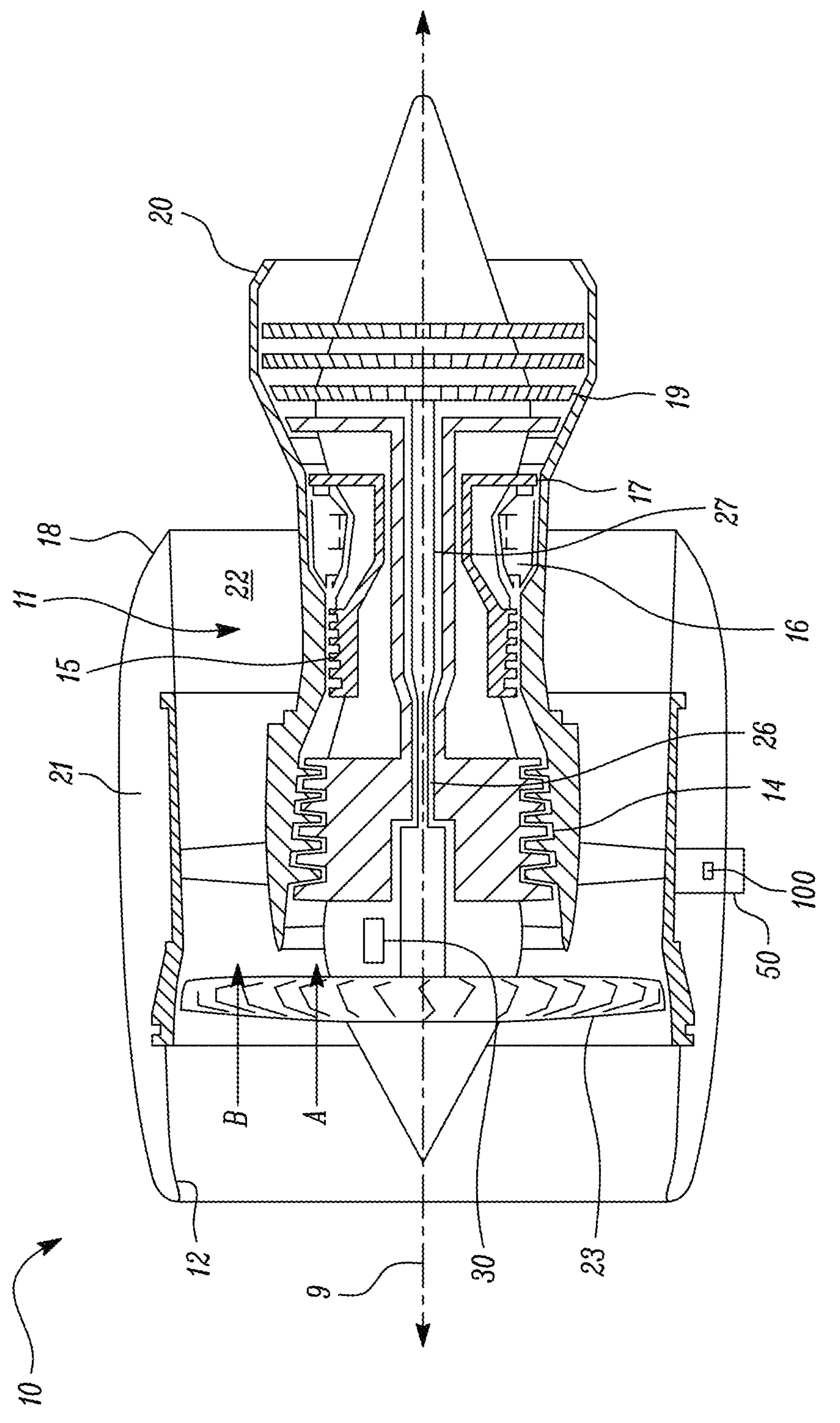
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high pressure compressor 15, a combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine 10 (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

In addition, the present disclosure is equally applicable to aero gas turbine engines, marine gas turbine engines, and land-based gas turbine engines.

The gas turbine engine 10 further includes a fuel supply system 50 (shown schematically in FIG. 1) to supply adequate amount of fuel to the gas turbine engine 10. The fuel supply system 50 includes a gear pump assembly 100 for pumping a fuel or a fluid. The fuel supply system 50 may also include other parts (not shown), such as an auxiliary gear box attached to the engine core 11.

Figure 2:
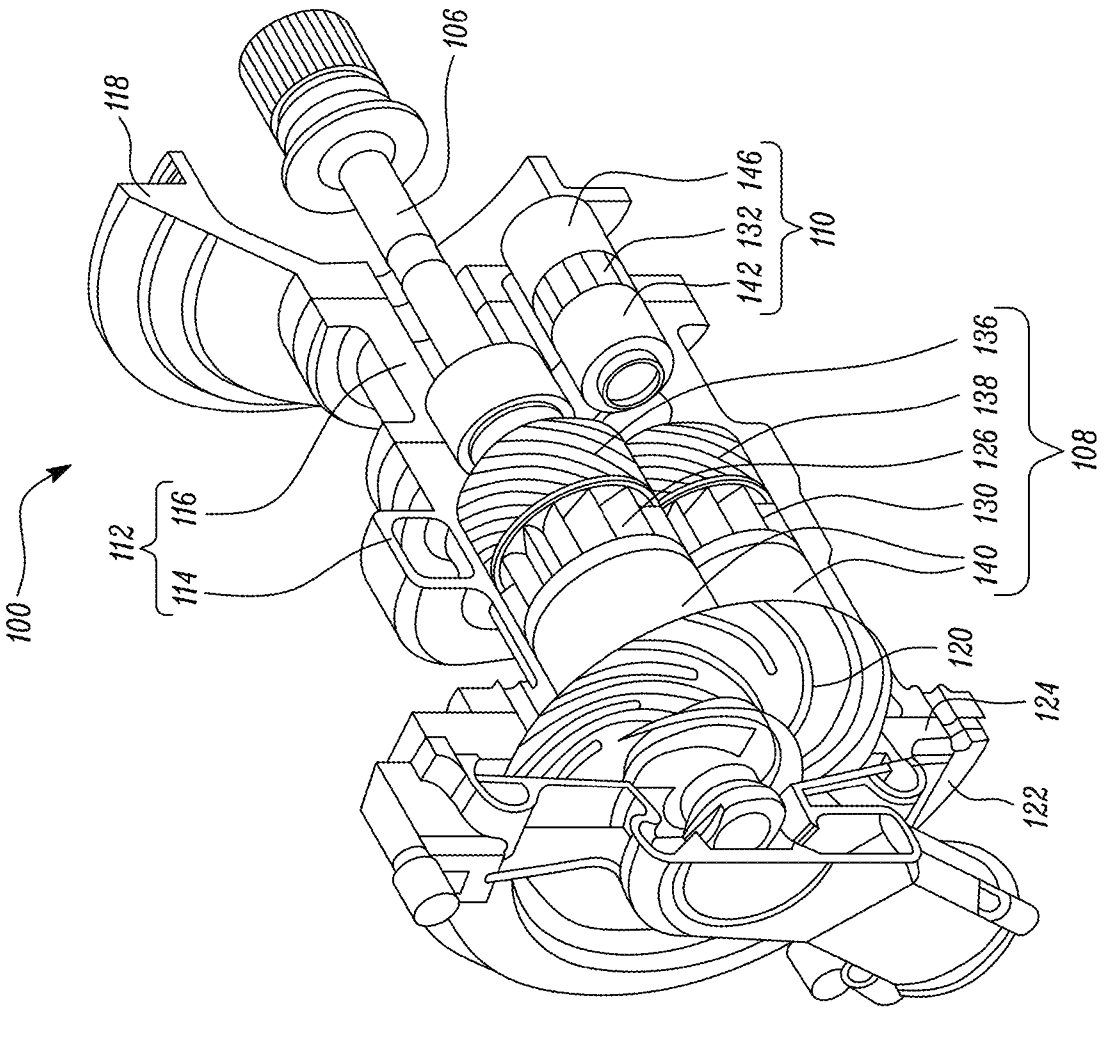
FIG. 2 is a cut away perspective view of a gear pump assembly for pumping a fluid in the gas turbine engine of FIG. 1, according to an embodiment of the present disclosure.
Figure 3:
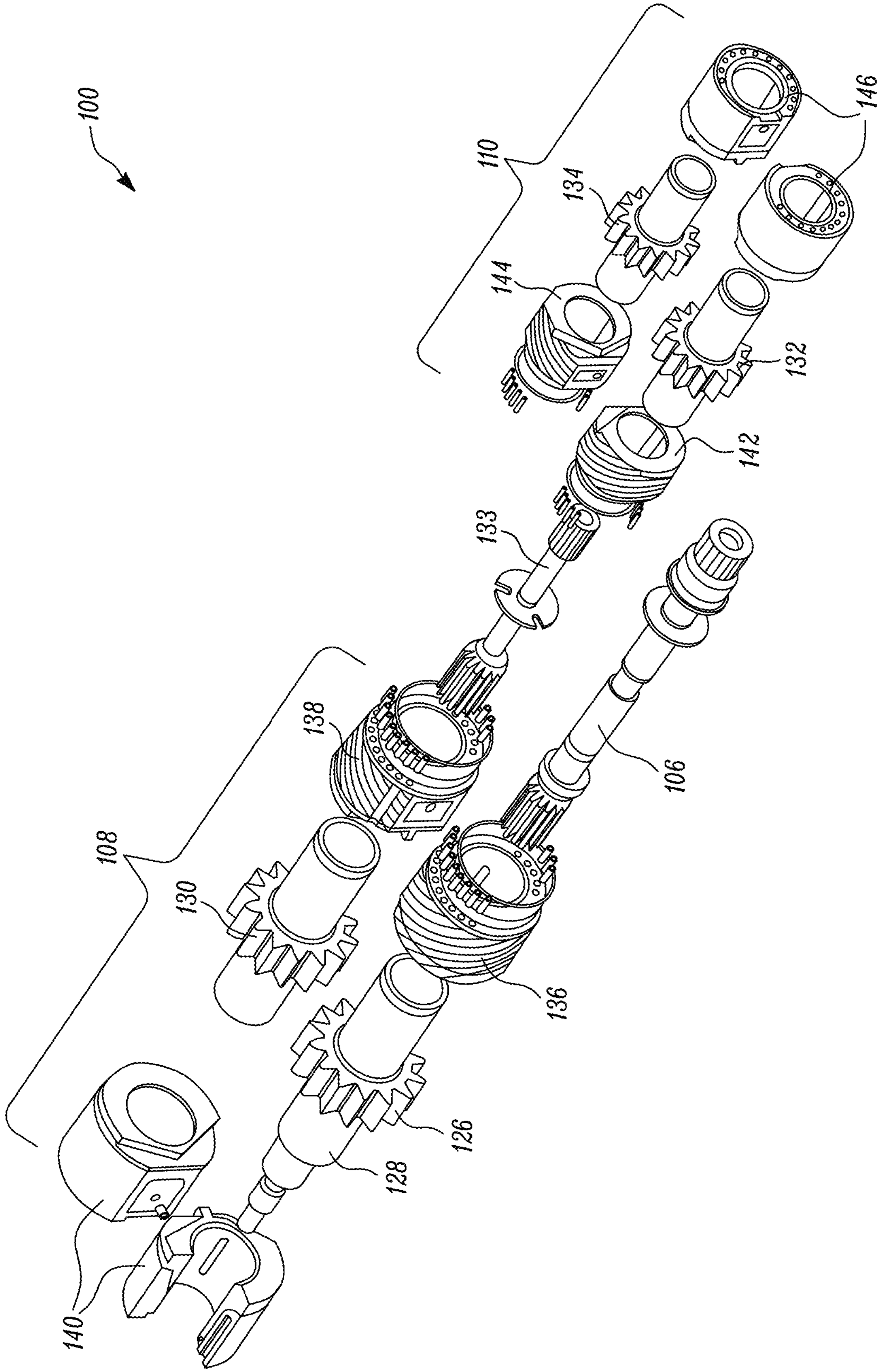
FIG. 3 is an exploded view of the gear pump assembly, with some components not shown.
Figure 4:
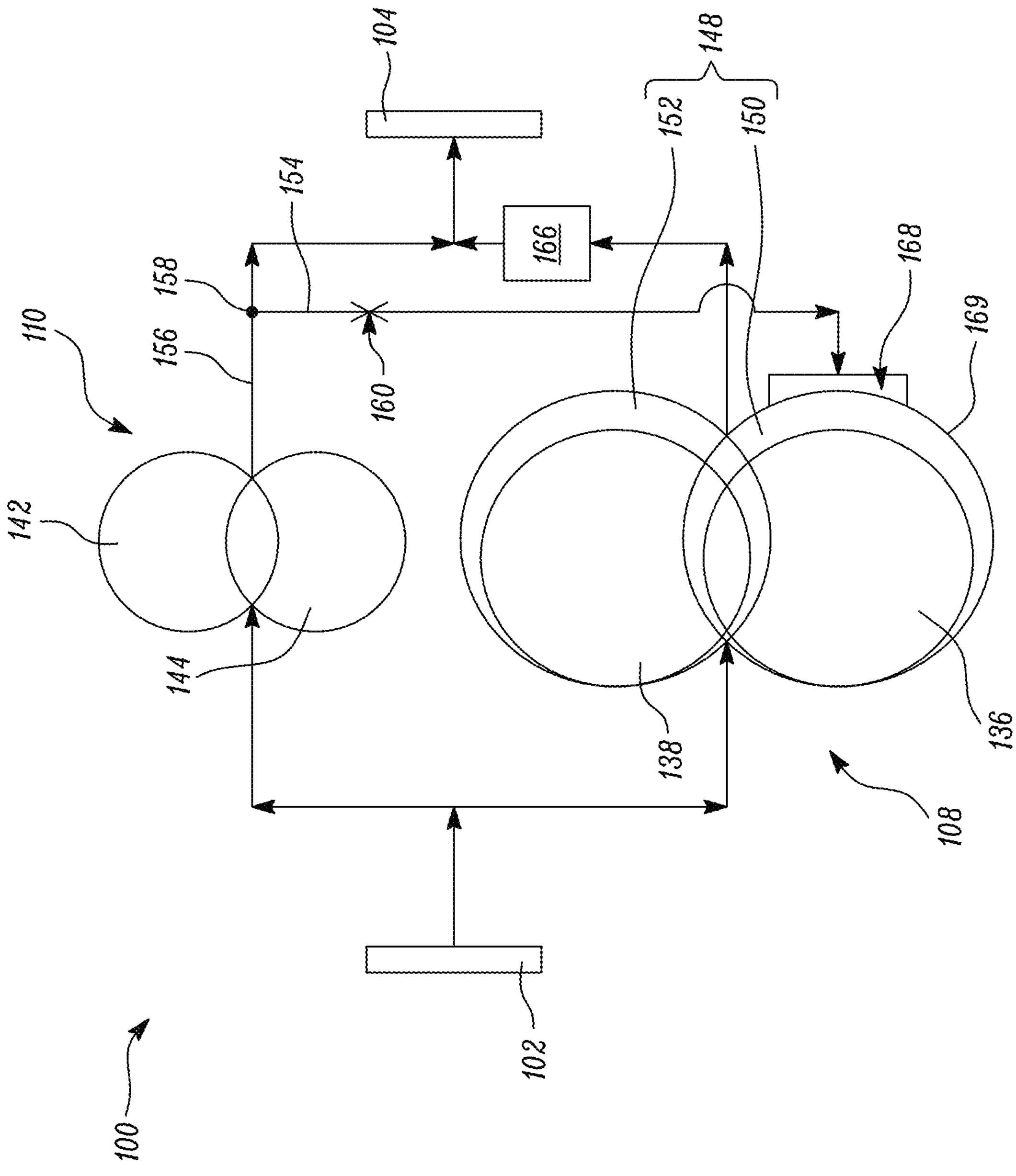
FIG. 4 is a schematic view of the gear pump assembly of FIG. 3, with some components not shown.

FIG. 2 is a cut away perspective view of the gear pump assembly 100, according to an embodiment of the present disclosure. FIG. 3 shows an exploded view of the gear pump assembly 100, with some components not shown, according to an embodiment of the present disclosure. Specifically, only gear components of the gear pump assembly 100 are shown in FIG. 3. FIG. 4 is a schematic view of the gear pump assembly 100, with some components not shown, according to an embodiment of the present disclosure.

Referring to FIGS. 2 to 4, the gear pump assembly 100 includes an inlet 102 (shown in FIG. 4) configured to receive the fluid (i.e., fuel) and an outlet 104 (shown in FIG. 4) to discharge a required amount of the fluid to the gas turbine engine 10. The gear pump assembly 100 further includes a main drive shaft 106, a secondary gear stage 108, and a primary gear stage 110 configured to pump the fluid from the inlet 102 to the outlet 104. The secondary gear stage 108 may be configured to selectively pump the fluid from the inlet 102 to the outlet 104.

The gear pump assembly 100 further includes a housing 112 receiving the primary gear stage 110 and the secondary gear stage 108 therein. Specifically, the housing 112 includes a secondary housing 114 for receiving the secondary gear stage 108 and a primary housing 116 for receiving the primary gear stage 110. The gear pump assembly 100 further includes a flange 118 for mounting of the gear pump assembly 100.

The gear pump assembly 100 further includes a centrifugal pump 120, a low-pressure stage housing 122 receiving the centrifugal pump 120, and a centrifugal stage back plate 124 which acts as an end cover for the secondary housing 114 and additionally as a back plate for the centrifugal pump 120. The low-pressure stage housing 122 is disposed remote from the flange 118.

The centrifugal pump 120 forms the low-pressure stage of the gear pump assembly 100. The primary gear stage 110 and the secondary gear stage 108 together form the high-pressure stage of the gear pump assembly 100. The secondary gear stage 108 has a greater displacement than the primary gear stage 110. Typically, the primary gear stage 110 is pressurized at all flight conditions, while the secondary gear stage 108 is pressurized for take-off and low speed start conditions. The secondary gear stage 108 functions as a step-a-side gear box for the primary gear stage 110.

Some components, such as the flange 118, the housing 112, and the ones associated with the centrifugal pump 120 are not shown in FIG. 3 for illustrative purposes.

The secondary gear stage 108 includes a secondary driver gear 126 driven by the main drive shaft 106. The main drive shaft 106 is powered and driven by an engine accessory gearbox (not shown). The main drive shaft 106 is connected directly to the secondary driver gear 126 of the secondary gear stage 108. The main drive shaft 106 is further connected, via an extension shaft 128, to an impeller (not shown) of the centrifugal pump 120.

The secondary gear stage 108 further includes a secondary driven gear 130 meshed with and driven by the secondary driver gear 126. The primary gear stage 110 includes a primary driver gear 132 drivably coupled to and driven by the secondary driven gear 130. The gear pump assembly 100 further includes a drive shaft 133 which drivably connects the secondary driven gear 130 and the primary driver gear 132. In other words, the drive shaft 133 transfers power from the secondary gear stage 108 to the primary gear stage 110. The primary gear stage 110 further includes a primary driven gear 134 meshed with and driven by the primary driver gear 132.

The secondary gear stage 108 further includes a secondary driver bearing block 136 disposed adjacent to and supporting the secondary driver gear 126. The secondary gear stage 108 further includes a secondary driven bearing block 138 disposed adjacent to and supporting the secondary driven gear 130. Each of the secondary driver bearing block 136 and the secondary driven bearing block 138 is a pressure loaded bearing block.

The secondary gear stage 108 further includes a pair of secondary solid bearing blocks 140. One secondary solid bearing block 140 from the pair of secondary solid bearing blocks 140 is disposed adjacent to and supports the secondary driver gear 126, and the other secondary solid bearing block 140 from the pair of secondary solid bearing blocks 140 is disposed adjacent to and supports the secondary driven gear 130.

The secondary driver bearing block 136 and the corresponding secondary solid bearing block 140 are adapted to receive a bearing shaft or journal of the secondary driver gear 126. The secondary driven bearing block 138 and the corresponding secondary solid bearing block 140 are adapted to receive a bearing shaft or journal of the secondary driven gear 130.

The pair of secondary solid bearing blocks 140 transfer load from their corresponding gear journals to the housing 112, and also transfer axial thrust load to the housing 112. The secondary driver bearing block 136 and the secondary driven bearing block 138 also transfer load from their corresponding gear journals to the housing 112, and in addition can provide an axial force and a moment against the axially directed face of the corresponding abutting gear.

The primary gear stage 110 further includes a primary driver bearing block 142 disposed adjacent to and supporting the primary driver gear 132. The primary gear stage 110 further includes a primary driven bearing block 144 disposed adjacent to and supporting the primary driven gear 134. Each of the primary driver bearing block 142 and the primary driven bearing block 144 is a pressure loaded bearing block.

The primary gear stage 110 further includes a pair of primary solid bearing blocks 146. One primary solid bearing block 146 from the pair of primary solid bearing blocks 146 is disposed adjacent to and supports the primary driver gear 132, and the other primary solid bearing block 146 from the pair of primary solid bearing blocks 146 is disposed adjacent to and supports the primary driven gear 134.

The housing 112 further includes a binocular bore 148 (shown in FIG. 4). The binocular bore 148 includes a driver bore portion 150 (shown in FIG. 4) receiving the secondary driver bearing block 136 therein. The binocular bore 148 further includes a driven bore portion 152 disposed adjacent to the driver bore portion 150 and receiving the secondary driven bearing block 138 therein.

The gear pump assembly 100 further includes a fluid passage 154 (shown in FIG. 4) extending through the housing 112 and fluidly communicating the primary gear stage 110 with the driver bore portion 150. In an embodiment, the fluid passage 154 may originate at the primary housing 116 in order to fluidly communicate the primary gear stage 110 with the driver bore portion 150. The fluid passage 154 allows a pressurized flow of the fluid from the primary gear stage 110 to the driver bore portion 150 in order to limit a movement of the secondary driver bearing block 136 within the driver bore portion 150.

The pressurized flow of the fluid from the primary gear stage 110 to the driver bore portion 150 in the secondary gear stage 108 generates an additional radial load on the secondary driver bearing block 136 thereby limiting the radial and axial movements of the secondary driver bearing block 136. The reduced movement of the secondary driver bearing block 136 may cause minimal wear of the secondary driver bearing block 136, particularly when the secondary gear stage 108 is in the depressurized state. The minimal wear of the secondary driver bearing block 136 may prevent radial deformation of the secondary driver bearing block 136 during the operation of the gear pump assembly 100.

Therefore, the inclusion of the fluid passage 154 between the primary gear stage 110 and the driver bore portion 150 may increase an efficiency and improve performance of the gear pump assembly 100. Inclusion of the gear pump assembly 100 in the fuel supply system 50 may improve an overall performance of the fuel supply system 50 to supply the fuel or fluid to the gas turbine engine 10.

In some embodiments, the gear pump assembly 100 further includes a pocket 168 disposed on a surface 169 of the driver bore portion 150. The pocket 168 is disposed in fluid communication with the fluid passage 154. The pocket 168 is configured to receive the pressurized flow of the fluid from the fluid passage 154 and deliver the pressurized fluid to the driver bore portion 150 in the secondary gear stage 108. The pocket 168 acts as a provision for the pressurized fluid to add radial load on the secondary driver bearing block 136 thereby limiting the radial and axial movements of the secondary driver bearing block 136. The pocket 168 may be formed by machining a portion of the driver bore portion 150.

In some embodiments, the gear pump assembly 100 includes a primary passage 156 (shown in FIG. 4) fluidly communicating the primary gear stage 110 with the outlet 104. The gear pump assembly 100 further includes a port 158 fluidly communicating the primary passage 156 with the fluid passage 154. Thus, the fluid passage 154 is a bleed passage between the primary passage 156 and the secondary gear stage 108. The bleed passage extends between the port 158 and the driver bore portion 150 in the secondary gear stage 108. The port 158 may be a vent formed in the housing 112 of the gear pump assembly 100. In an embodiment, the port 158 may be a vent formed in the primary housing 116 (shown in FIG. 2).

In some embodiments, the gear pump assembly 100 further includes a non-return valve 166 fluidly disposed between the secondary gear stage 108 and the outlet 104. The non-return valve 166 is configured to allow a unidirectional flow from the secondary gear stage 108 to the outlet 104. The non-return valve 166 prevents a backflow of the fluid from the outlet 104 to the secondary gear stage 108. The non-return valve 166 maintains an adequate pressure range in the secondary gear stage 108. In an application, the non-return valve 166 may be a check valve.

In some embodiments, the gear pump assembly 100 further includes a flow restrictor 160 fluidly disposed in the fluid passage 154 between the primary gear stage 110 and the driver bore portion 150 to limit a leakage of the fluid from the primary gear stage 110 to the driver bore portion 150. This may ensure that an adequate pressure is maintained to provide sufficient radial load on the secondary driver bearing block 136 so as to limit the radial and axial movements of the secondary driver bearing block 136. Prevention of fluid leakage from primary gear stage 110 to the secondary gear stage 108 may ensure that the secondary gear stage 108 is not pressurized at lower flow pressures of the fluid in the gear pump assembly 100.

In some embodiments, the flow restrictor 160 is a pressure-actuated valve. The pressure-actuated valve may be set to actuate at a particular threshold pressure or may be externally adjustable so as to control the pressurized flow of the fluid from the primary gear stage 110 to the driver bore portion 150 in the secondary gear stage 108.

In some embodiments, the flow restrictor 160 is an electrically actuated valve. The electrically actuated valve may control the amount of fluid which can be conveyed from the primary gear stage 110 to the driver bore portion 150 in the secondary gear stage 108 in response to receiving a control signal from a controller (not shown). The electrically actuated valve may be a solenoid-controlled valve.

Figure 5:
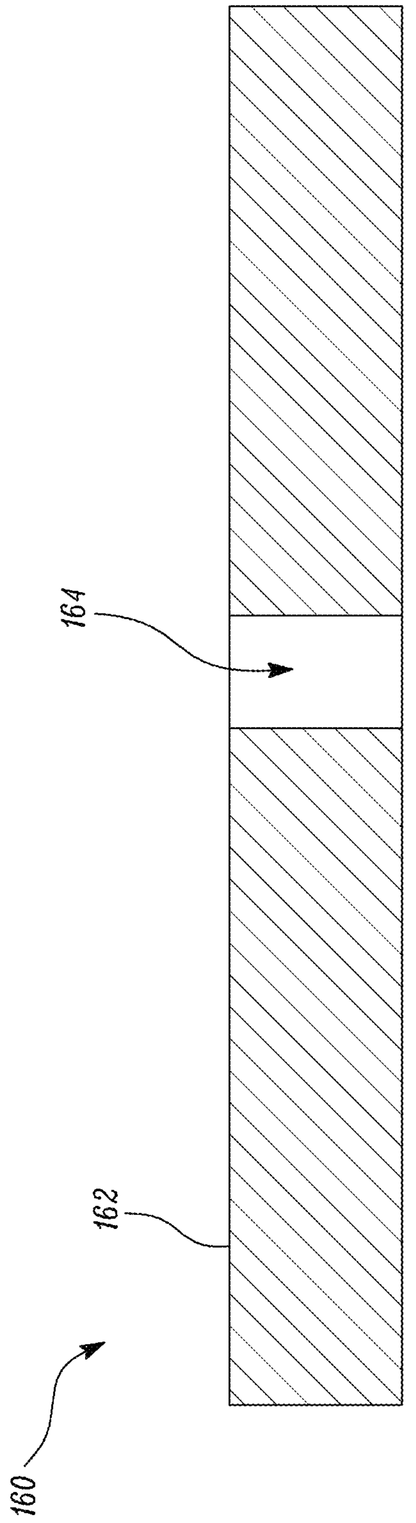
FIG. 5 is a schematic view of a flow restrictor of the gear pump assembly of FIG. 4.

FIG. 5 is a schematic view of the flow restrictor 160, according to an embodiment of the present disclosure. In some embodiments, the flow restrictor 160 is an orifice plate 162 including at least one orifice 164. The orifice plate 162 controls an amount of fluid which can be conveyed from the primary gear stage 110 to the driver bore portion 150 in the secondary gear stage 108. In the illustrated embodiment of FIG. 5, the at least one orifice 164 includes a single orifice 164.

In an application, the at least one orifice 164 may include a plurality of orifices. The plurality of orifices 164 may have the same diameter or have different diameters. The at least one orifice 164 may have a circular configuration.

Figure 6:
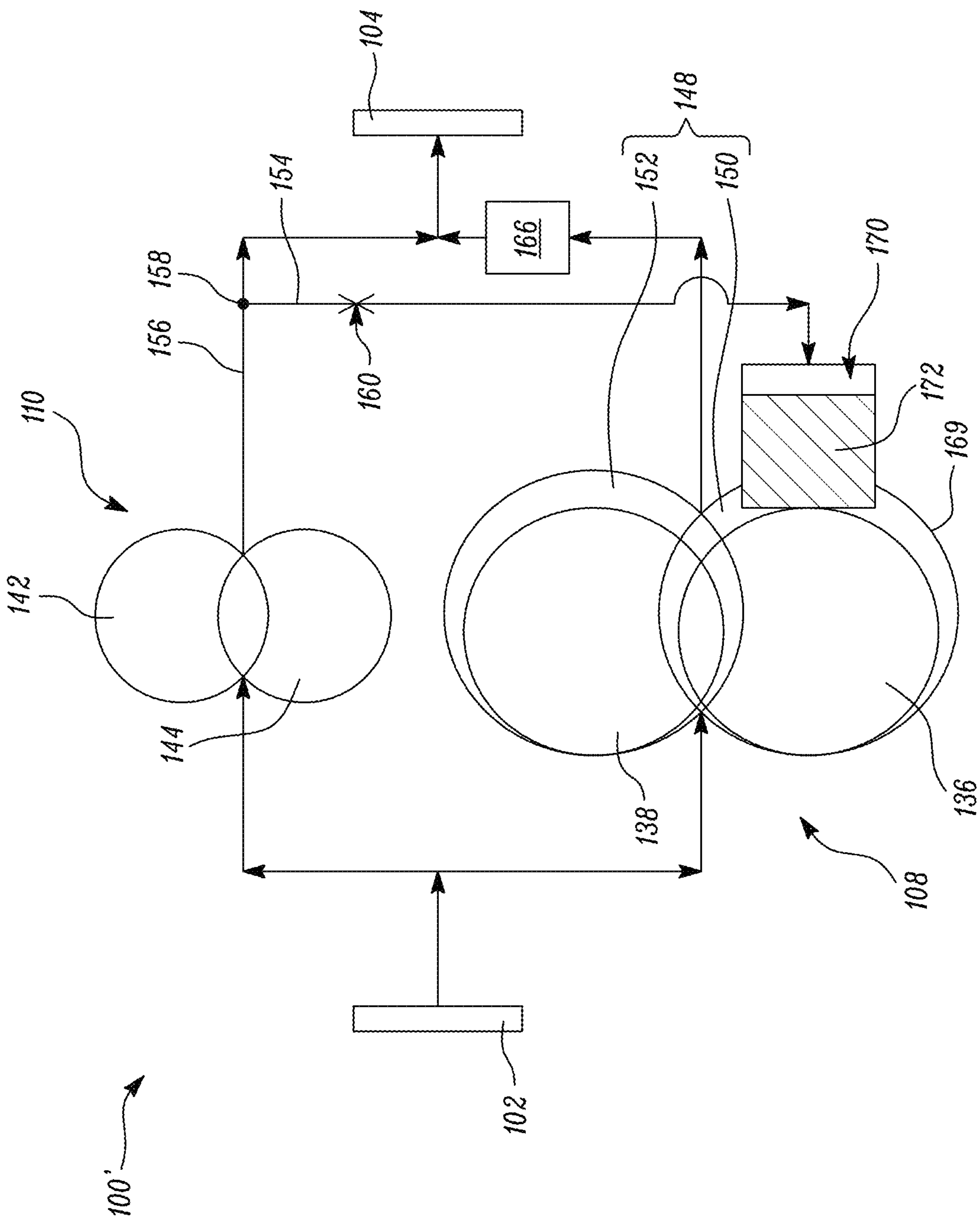
FIG. 6 is a schematic view of a gear pump assembly of FIG. 3, with some components not shown, according to another embodiment of the present disclosure.

FIG. 6 is a schematic view of a gear pump assembly 100', with some components not shown, according to an embodiment of the present disclosure. The gear pump assembly 100' is substantially similar to the gear pump assembly 100 of FIG. 4. A functional advantage of the gear pump assembly 100' is the same as that of the gear pump assembly 100. However, the gear pump assembly 100' does not include any pocket (i.e., the pocket 168 disposed on the surface 169 of the driver bore portion 150).

The gear pump assembly 100' further includes a piston bore 170 extending from the driver bore portion 150 and disposed in fluid communication with the fluid passage 154. The gear pump assembly 100' further includes a piston 172 slidably received within the piston bore 170 and engaging the secondary driver bearing block 136. The piston 172 is configured to be driven by the pressurized fluid towards the secondary driver bearing block 136 in order to apply a movement limiting force on the secondary driver bearing block 136. The piston 172 is energized by the flow of the pressurized fluid in order to apply additional radial load on the secondary driver bearing block 136 which in turn reduces the wear of the secondary driver bearing block 136.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A gear pump assembly for pumping a fluid, the gear pump assembly comprising:

an inlet configured to receive the fluid;

an outlet;

a main drive shaft;

a secondary gear stage comprising a secondary driver gear driven by the main drive shaft, a secondary driver bearing block disposed adjacent to and supporting the secondary driver gear, a secondary driven gear meshed with and driven by the secondary driver gear, and a secondary driven bearing block disposed adjacent to and supporting the secondary driven gear;

a primary gear stage configured to pump the fluid from the inlet to the outlet, the primary gear stage comprising a primary driver gear drivably coupled to and driven by the secondary driven gear, and a primary driven gear meshed with and driven by the primary driver gear;

a housing receiving the primary gear stage and the secondary gear stage therein, the housing comprising a binocular bore, the binocular bore comprising:

a driver bore portion receiving the secondary driver bearing block therein; and a driven bore portion disposed adjacent to the driver bore portion and receiving the secondary driven bearing block therein; and a fluid passage extending through the housing and fluidly communicating the primary gear stage with the driver bore portion, wherein the fluid passage allows a pressurized flow of the fluid from the primary gear stage to the driver bore portion in order to limit a movement of the secondary driver bearing block within the driver bore portion.

2. The gear pump assembly of claim 1, further comprising a flow restrictor fluidly disposed in the fluid passage between the primary gear stage and the driver bore portion to limit a leakage of the fluid from the primary gear stage to the driver bore portion.

3. The gear pump assembly of claim 2, wherein the flow restrictor is an orifice plate comprising at least one orifice.

4. The gear pump assembly of claim 2, wherein the flow restrictor is a pressure-actuated valve.

5. The gear pump assembly of claim 2, wherein the flow restrictor is an electrically actuated valve.

6. The gear pump assembly of claim 1, further comprising a pocket disposed on a surface of the driver bore portion and disposed in fluid communication with the fluid passage, wherein the pocket is configured to receive the pressurized flow of the fluid from the fluid passage and deliver the pressurized fluid to the driver bore portion.

7. The gear pump assembly of claim 1, further comprising:

a piston bore extending from the driver bore portion and disposed in fluid communication with the fluid passage; and a piston slidably received within the piston bore and engaging the secondary driver bearing block, wherein the piston is configured to be driven by the pressurized fluid towards the secondary driver bearing block in order to apply a movement limiting force on the secondary driver bearing block.

8. The gear pump assembly of claim 1, further comprising a non-return valve fluidly disposed between the secondary gear stage and the outlet, wherein the non-return valve is configured to allow a unidirectional flow from the secondary gear stage to the outlet.

9. The gear pump assembly of claim 1, further comprising:

a primary passage fluidly communicating the primary gear stage with the outlet; and a port fluidly communicating the primary passage with the fluid passage.

10. The gear pump assembly of claim 1, wherein the secondary gear stage has a greater displacement than the primary gear stage.

11. A fuel supply system of a gas turbine engine, the fuel supply system including the gear pump assembly of claim 1 for pumping a fuel.

12. A gas turbine engine including the fuel supply system of claim 11.

* * * * *